UNITED STATES PATENT OFFICE.

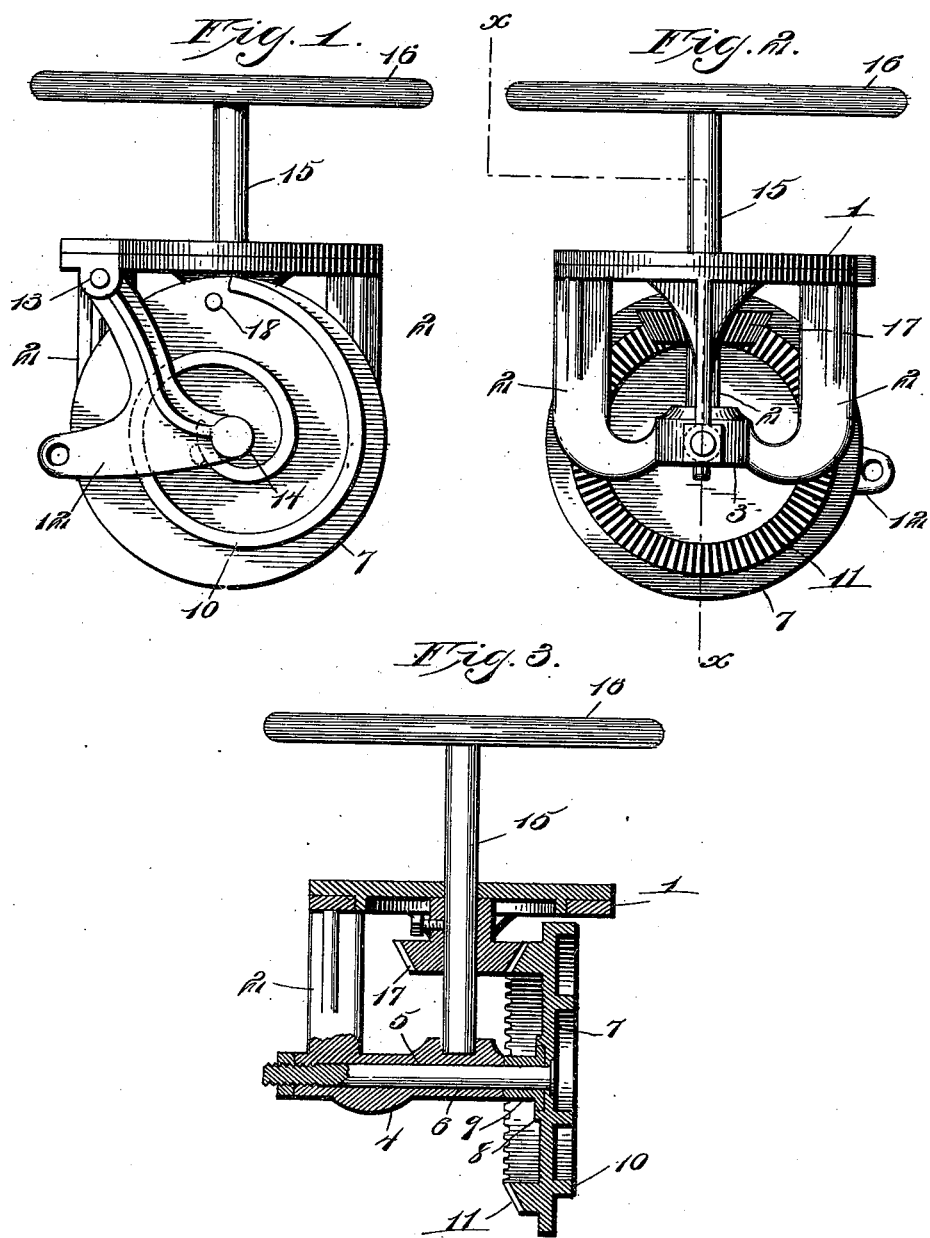

CHARLES E. KIRK, OF MARION, INDIANA.

ATTACHMENT FOR CAR-BRAKES.

SPECIFICATION forming part of Letters Patent No. 667,094, dated January 29, 1901.

Application filed June 4, 1900. Serial No. 19,014. (No model.)

*To all whom it may concern:*

Be it known that I, CHARLES E. KIRK, a citizen of the United States, residing at Marion, in the county of Grant and State of Indiana, have invented new and useful Improvements in Attachments for Car-Brakes, of which the following is a specification.

This invention relates to new and useful improvements in brakes for cars and similar vehicles, and more especially to an attachment whereby the brake may be quickly applied by utilizing the minimum amount of power and which obviates the necessity of using the pawl and ratchet as in brakes generally used.

To these ends the invention consists in providing a plate with a spiral upon the face thereof adapted to engage a stud formed upon a lever which is pivoted to the truck. This lever is attached to the chains of the ordinary brake-shoes and is adapted to be swung back and forth by the said spiral when the disk or plate is revolved upon its shaft.

The invention also consists in providing suitable means whereby motion may be imparted to this disk in either direction.

The invention also consists in the further novel construction and combination of parts hereinafter more fully described and claimed, and illustrated in the accompanying drawings, showing the preferred form of my invention, and in which—

Figure 1 is a front elevation. Fig. 2 is a rear elevation; and Fig. 3 is a section on line $x\ x$, Fig. 2.

Referring to said figures by numerals of reference, 1 is the body of the device, which is formed integral with or is detachably secured to hangers 2, which are connected at their lower ends, as at 3, and provided with a lateral extension 4, which has a passage 5 therein, within which is secured a fixed shaft or bolt 6. This bolt extends from the free end of the extension and forms a bearing for a disk 7, which is provided upon its rear face with an annular rib or flange 8, which incloses and bears upon a sleeve 9, mounted upon the shaft 6. The front face of the disk 7 is provided with a spiral rib 10, extending from the periphery thereof to the center, and projecting from the rear face of said disk, near the edge thereof, are gear-teeth 11, preferably beveled, as shown.

A bell-crank lever 12 is pivoted between ears 13 formed upon the body 1, and is provided with a stud or extension 14, which bears upon the rib 10 of the disk and is moved thereby from or toward the center of the disk when said disk is revolved upon its shaft. This bell-crank lever is connected in any suitable manner, as by means of chains, &c, to brake-shoes of any desired contruction.

A shaft 15 is journaled within the extension 4 and the body 1 and is provided at its upper end with a wheel 16 or any other suitable means whereby the same may be readily revolved manually. A beveled pinion 17 is fixed to this shaft and meshes with the teeth 11 of the disk and will, as is obvious, impart motion thereto when the shaft 15 is revolved. A pin or lug 18 extends from the face of the disk at a point adjacent to the outer end of the rib 10 and is adapted to limit the movement of the disk by contacting with the stud 14 of the bell-crank lever.

While I have shown and described the disk as provided with a rib 10, I do not limit myself thereto, as in lieu thereof a groove may be formed within the face.

The operation of the device will be readily understood from the foregoing description when taken in connection with the drawings. It will be seen that by revolving the shaft 15 motion will be imparted to the disk, and the same in revolving will move the bell-crank lever either from or toward the center of the disk, thereby slacking or tightening the truck-chains, as will be obvious. It will be seen that a positive motion will be imparted to the chains and that the brake-shoes will be firmly clamped upon the periphery of the wheels until the motion of the disk is reversed. Moreover, by this construction the disk will not move except when motion is imparted thereto through the shaft 15, thereby obviating the necessity of using a pawl and ratchet, as heretofore.

It will be understood that the plate or body 1 can be secured in any suitable manner to the truck or to the car-body and the vehicle.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus described my invention, what I claim as new, and desire to secure by Letters Patent, is—

1. The combination with a body and a hanger; of a disk mounted upon the hanger; a curved guide extending from the center to the periphery of said disk; a lever pivoted to the body and engaging the guide; and means for imparting motion to said disk.

2. The combination with a body and a hanger; of an extension thereto; a disk mounted upon the extension; a spiral extending from the center to the periphery of the disk; a bell-crank lever pivoted to the body; a stud thereon engaging the spiral; and means for imparting motion to the disk.

3. The combination with a body and a hanger extending therefrom; of an extension to the hanger; a disk journaled thereon; a spiral upon the face of the disk and extending from the center to the periphery thereof; a stop adjacent to the outer end of the spiral; teeth upon the opposite face of the disk; a bell-crank lever pivoted to the body; a stud thereon engaging the spiral; a shaft journaled within the body and the hanger; a pinion thereon engaging the teeth of the disk; and a wheel upon the shaft.

In testimony whereof I affix my signature in presence of two witnesses.

CHARLES E. KIRK.

Witnesses:
JOSEPH W. KIRK,
FRANK KEM.